No. 846,129. PATENTED MAR. 5, 1907.
C. S. MORSE.
SLIDING DOOR FASTENER.
APPLICATION FILED APR. 25, 1906.

Witnesses:
Chas. E. Gorton.
M. A. Nyman.

Inventor:
Clyde S. Morse.
By Chas. C. Gilman
Atty

UNITED STATES PATENT OFFICE.

CLYDE S. MORSE, OF SHABBONA, ILLINOIS.

SLIDING-DOOR FASTENER.

No. 846,129.    Specification of Letters Patent.    Patented March 5, 1907.

Application filed April 25, 1906. Serial No. 313,588.

*To all whom it may concern:*

Be it known that I, CLYDE S. MORSE, a citizen of the United States, residing at Shabbona, in the county of Dekalb and State of Illinois, have invented certain new and useful Improvements in Sliding-Door Fasteners, of which the following is a specification.

This invention relates to improvements in a fastener or fastening device to be used for connecting and drawing together two pieces and firmly securing them in relation to one another.

The different purposes to which the device may be applied are numerous—for instance, it may be used for connecting and securing two sliding doors, an ordinary door to its jamb, two window-sashes, or may be employed for firmly yet detachably securing the end-gates of wagon boxes or bodies in place; and it consists of certain peculiarities of the construction, novel arrangement, and operation of the various parts thereof, as will be hereinafter more fully set forth and specifically claimed.

The principal objects of the invention are to provide an exceedingly simple, strong, durable, and effective fastener which may be used for connecting and securing together two pieces or parts of almost any kind of a structure, and which shall be adjustable, easily applied to the parts to be connected or removed therefrom, and which shall be so constructed that when the parts of the device are in their locked positions the pieces which are connected thereby will be firmly secured together, yet may be readily released from one another.

Other objects and advantages of the invention will be disclosed in the subjoined description and explanation.

In order to enable others skilled in the art to which my invention pertains to make and use the same, I will now proceed to describe it, referring to the accompanying drawing, in which—

Figure 1:
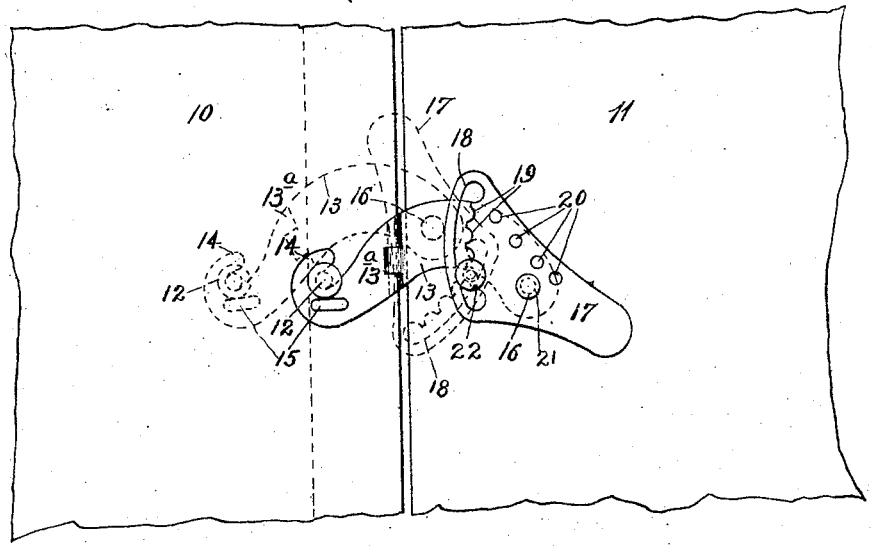
Figure 2:
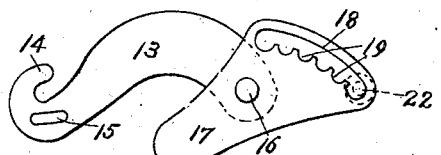
Figure 4:
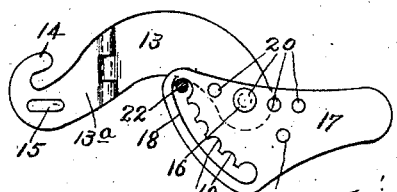
Figure 3:
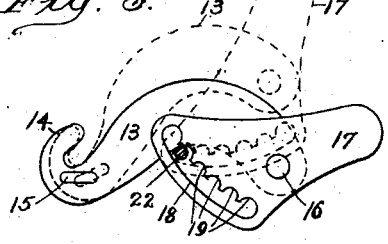
Figure 5:
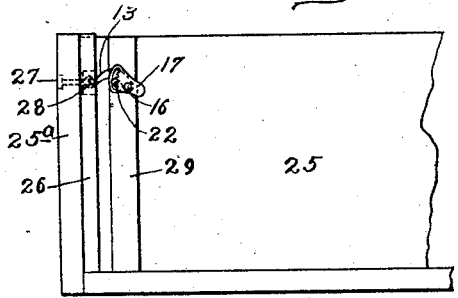
Figure 7:
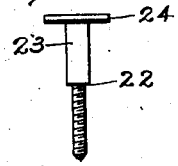
Figure 6:
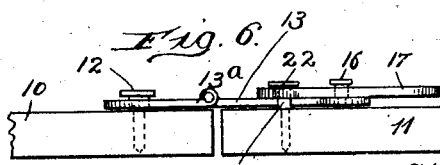

Figure 1 is a view in side elevation of portions of two sliding doors, showing my improved fastener applied thereto and illustrating by dotted lines the position of the parts when the adjacent edges of the doors are considerably separated and the hooked member engaging with the pin or projection on one of said doors and showing by continuous lines the doors drawn toward each other and the parts of the fastener in their locked positions. Fig. 2 is a detached side view of the fastening device, showing a modification in its construction and illustrating its members in their extended positions. Fig. 3 is a similar view showing by continuous lines the members of the fastener in their locked positions and by dotted lines in the positions they will assume during the act of being locked. Fig. 4 is a detached view, in side elevation, of the fastener constructed as shown in Fig. 1, but showing its members connected together in a different manner from that shown in Fig. 1. Fig. 5 is a rear end view of a portion of a wagon-body and its rear end-gate, showing the fastening device applied thereto and in position to secure the end-gate in place. Fig. 6 is a bottom end view of Fig. 1, and Fig. 7 is a detail view of the fulcrum or pivot-bolt for the members of the fastener.

Like numerals of reference refer to corresponding parts throughout the different views of the drawing.

The reference-numerals 10 and 11 designate portions of two pieces to be connected and secured together, which in the present instance may be assumed as being portions of two sliding doors; but it will be understood that they may represent other pieces which it is desired to connect and secure together. One of the doors or pieces 10 is provided with a projection 12, which in the present instance is shown as being a headed bolt or screw, but which may be an ordinary staple, if desired. This projection 12 is located at a suitable distance from that edge of the door 10 adjacent to the corresponding edge of the door 11 and is adapted to be engaged by the member 13, which is formed with a hook 14 to engage said projection. The member 13 of the fastener is also provided near the hook 14 with a slot 15 to receive the staple when such is used instead of the headed bolt 12 and when it is desired to permanently lock the pieces 10 and 11 together, which may be done by placing a padlock through the staple which is extended through the slot 15. As shown in the different views of the drawing, the hooked member 13 of the fastener is made of a flat piece of metal and is upwardly curved and is pivotally secured, by means of a rivet or bolt 16 near its end opposite that which is provided with the hook 14, to the operating member or lever 17, which is also preferably made of a flat piece of metal and has near one of its ends a curved slot 18, one edge of which is provided with a series of recesses 19 for the purpose to be presently explained and is provided near one of its side edges with a series of openings 20, arranged in a row, and with another opening 21 near its middle. The lever or operating member 17 is secured on the door or one of the pieces 11 by means of a fulcrum or pivot 22, which is preferably provided with an enlarged part 23 and a head 24, as is clearly shown in Fig. 7 of the drawing, the enlarged part 23 being of sufficient length to permit the members 13 and 17 to move freely between the head 24 and the inner end of said enlarged part.

As shown in Fig. 1 of the drawing, the fulcrum 22 for the lever 17 is secured on the door or piece 11 on a horizontal line with the projection 12 on the door or piece 10 and passes through the slot 18, but rests in one of the recesses 19 of said slot, so that when the members of the fastener are in their locked positions, as shown by continuous lines in Fig. 1, the pivot 16, which unites the members 13 and 17, will be below the plane or horizontal line on which the projection 12 and fulcrum 22 are located or out of alinement with said projection and fulcrum, thus firmly holding the doors or pieces together or in locked relation. When thus locked, the curved portion of the member 13 will rest on the fulcrum 22, and the construction of the members 13 and 17 is such that when the member 17 is turned from the position indicated by dotted lines in Fig. 1 to that indicated by continuous lines in said figure great force will be inserted through the member 13, so as to draw the piece 10 toward the piece 11, where they will be firmly held.

In Fig. 4 the construction of the members of the fastener is the same as that shown in Fig. 1; but it will be observed that instead of locating the pivot 16 in the opening 21, as shown in Fig. 1, the said pivot which connects the two members is located in one of the openings 20 near the upper edge of the member 17, and that the fulcrum 22 for the member 17 is located in the upper recess 19 of the slot 18 instead of being located in one of the lower recesses of said slot, thus increasing the reach or length of the members, so as to accommodate the fastener to pieces which may be more widely separated.

In Figs. 2 and 3 the openings 20 near one of the edges of the member 17 is shown as being omitted, and it is apparent that by locating the fulcrum 22 in one of the lower recesses 19 (see Fig. 3) the leverage of the member 17 will be increased, or by placing it in one of the upper of said recesses, as shown in said figure, it will be diminished. In Fig. 2 the members 13 and 17 are shown in a position in which the fastener may be used for connecting two pieces at a considerable distance apart, and when arranged in such position it is evident that they will simply act as a latch, but not as a lock.

In Fig. 5 of the drawing I have shown a portion of a wagon body or box and a portion of the rear end-gate 25 therefor with my improved fastener in position for securing the end-gate in place. Through the side-board 25ª of the box and vertical cleat 26 thereon is extended a bolt 27, which has on its inner end an eye 28 for engagement with the hook 14 of the member 13, which may be connected to the member 17 of the fastener in either of the ways above described, which member is fulcrumed on a vertical cleat 29 on the end-gate 25 near its end adjacent to the side-board 25ª, as is clearly shown in Fig. 5 of the drawing. To disengage the fastener from the projection 12 or eye 28 of the bolt 27 when used in connection with a wagon-body, it is only necessary to raise the free end of the member 17 until the pivot 16 is forced above or beyond the horizontal line or plane on which the fulcrum 22 and engaging device for the hook of the member 13 is located, when it is apparent that the member 13 will be disengaged from its projection or engaging device by gravity.

In order that the member 13 may properly engage a staple, it is preferably made in two pieces 13 and 13ª, hinged together, as shown in Figs. 1 and 4, so that the piece 13ª may be turned outwardly until the staple is allowed to enter the slot 15, when it may be pressed inwardly.

Having thus fully described my invention, what I claim as new, and desire to secure by Letters Patent, is—

1. In a sliding-door fastener, the combination with an operating member or lever fulcrumed to one of the pieces to be connected together so as to be moved in a plane parallel with the surface of the door and having near one of its ends a transverse slot, of an engaging member pivotally secured at one of its ends to the first-named member and having at its other end a hook to engage a projection or engaging device on the other piece to be connected, and adapted to move in a plane parallel with the surface of the door, substantially as described.

2. In a sliding-door fastener, the combination with an operating member or lever having near one of its ends a transverse slot, of a fulcrum secured to one of the pieces to be connected together and extending through said slot, an engaging member pivotally secured at one of its ends to the first-named member and having at its other end a hook to engage a projection or engaging device on the other piece to be connected, the said lever and engaging member adapted to move in a plane parallel with the surface of the door, substantially as described.

3. In a sliding-door fastener, the combination with an operating member or lever having near one of its ends a transverse slot provided in one of its edges with a series of recesses, of a fulcrum secured to one of the pieces to be connected together and located in one of the recesses of said slot, a curved engaging member pivotally secured at one of its ends to the first-named member and having at its other end means to engage a projection or engaging device on the other piece to be connected, substantially as described.

4. In a sliding-door fastener, the combination with an operating member or lever having near one of its ends a transverse slot provided in one of its edges with a series of recesses, of a fulcrum secured to one of the pieces to be connected together and located in one of the recesses of said slot, a curved engaging member pivotally secured at one of its ends to the first-named member and having at its other end a hook and a slot for engagement with a projection on the other piece to be connected, substantially as described.

5. In a sliding-door fastener, the combination with an operating member or lever having in one of its ends a transversely-curved slot provided in one of its edges with a series of recesses and having near one of its edges a series of openings, of a curved engaging member having at one of its ends a hook and adapted at its other end to be pivotally secured to the operating member, substantially as described.

6. In a sliding-door fastener, the combination with an operating member or lever fulcrumed to one of the pieces to be connected together, of an engaging device located on the other piece to be connected, an engaging member pivotally secured at one of its ends to the first-named member and having at its other end means to engage said engaging device, the pivot of said members being located at a point which when the operating member has been turned to the limit of its locking movement will be out of alinement with the fulcrum and engaging device, substantially as described.

CLYDE S. MORSE.

Witnesses:
CHAS. C. TILLMAN,
M. A. NYMAN.